United States Patent
Baccouche et al.

(10) Patent No.: US 8,827,356 B2
(45) Date of Patent: Sep. 9, 2014

(54) INFLATABLE SIDE RAIL DEFLECTOR APPARATUS FOR SMALL OFFSET COLLISIONS

(75) Inventors: Mohamed Ridha Baccouche, Ann Arbor, MI (US); Manoharprasad K. Rao, Novi, MI (US); Saied Nusier, Canton, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/449,790

(22) Filed: Apr. 18, 2012

(65) Prior Publication Data

US 2013/0278013 A1 Oct. 24, 2013

(51) Int. Cl.
*B62D 25/08* (2006.01)
*B60R 19/32* (2006.01)

(52) U.S. Cl.
USPC .................................. 296/187.1; 296/187.06

(58) Field of Classification Search
CPC B60R 19/34; B60R 21/36; B60R 2021/0009; B60R 2021/0029; B60R 2021/0023; B60R 2021/0025
USPC ............... 296/187.03, 187.06, 187.09, 187.1, 296/187.11, 187.12; 293/48, 132–134, 107; 180/274, 282
See application file for complete search history.

(56) References Cited

U.S. PATENT DOCUMENTS

| | | | |
|---|---|---|---|
| 2,218,690 A * | 10/1940 | Strauch | 280/847 |
| 3,499,661 A | 3/1969 | Rowe, Jr. | |
| 3,881,742 A | 5/1975 | Felzer | |
| 4,411,462 A * | 10/1983 | Buehrig et al. | 296/187.06 |
| 6,019,419 A * | 2/2000 | Browne et al. | 296/187.1 |
| 6,142,521 A * | 11/2000 | Shephard | 280/748 |
| 6,341,813 B1 * | 1/2002 | Taghaddos | 296/187.06 |
| 6,460,889 B2 | 10/2002 | Iyanagi et al. | |
| 7,185,728 B2 * | 3/2007 | Makita et al. | 180/274 |
| 7,216,904 B2 | 5/2007 | Thomas | |
| 7,268,675 B2 * | 9/2007 | Schneider et al. | 340/436 |
| 7,556,118 B2 * | 7/2009 | Huh et al. | 180/274 |
| 7,988,183 B1 * | 8/2011 | Okamoto et al. | 280/728.2 |
| 8,353,380 B2 * | 1/2013 | Schonberger et al. | 180/274 |
| 2005/0248184 A1 * | 11/2005 | Piffaretti | 296/187.03 |
| 2009/0039625 A1 * | 2/2009 | Breed | 280/729 |

FOREIGN PATENT DOCUMENTS

DE 4414661 * 11/1995

OTHER PUBLICATIONS

Dr. Winkler Stephan et al, (SFT Graz) "Sliding Collisions in Case of Frontal Crash with Small Lateral Offset", Vehicle Safety Department/Crashsimulation, (Steyr-Daimler-Puch Fahrzeugtechnik), pp. 1-12.

* cited by examiner

*Primary Examiner* — Dennis H Pedder
(74) *Attorney, Agent, or Firm* — Raymond L. Coppiellie; Brooks Kushman P.C.

(57) ABSTRACT

An inflatable member, or deflector, is attached to the frame of the vehicle. The deflector in the expanded condition at least partially fills a space defined by a bumper beam, a portion of the frame, a front tire and a portion of the vehicle body. A sensor provides a signal to a controller to actuate an inflator. The sensor may be a contact sensor, such as an accelerometer or an electro-resistive sensor, or the sensor may be a predictive sensor, such as a radar sensor or a machine vision sensor.

18 Claims, 3 Drawing Sheets

INFLATABLE SIDE RAIL DEFLECTOR APPARATUS FOR SMALL OFFSET COLLISIONS

TECHNICAL FIELD

This disclosure relates to an expandable deflector attached to a sub-frame, or other frame part, of a vehicle that displaces the vehicle laterally or imparts a rotational moment to the vehicle in a frontal impact with a laterally offset object.

BACKGROUND

Vehicles are designed and tested for crashworthiness. One parameter in testing vehicle design is the extent of any intrusion into a passenger compartment of a vehicle as a result of a crash test. Intrusions may be measured in a variety of locations, including areas identified, for example, as the toe pan, brake pedal, instrument panel, footrest and door opening.

Frontal crash tests focus on impacts with objects that are centrally located between the frame rails of the vehicle. The bumper beam of a vehicle is generally secured to the vehicle frame through crush cans, or other intervening structures, that are designed to absorb energy. Crush cans absorb impact energy by progressively collapsing. The extent or possibility of any intrusion of an object into the passenger compartment is reduced by the energy absorbed by the crush cans.

Recently, more stringent standards have been proposed that are designed to test a vehicle in a 40 mph crash with an object that is located in the outer one-fourth of the transverse width of the vehicle. Impacts in this area may be outboard of the vehicle frame. It is not feasible to provide additional crush cans in this area to absorb the impact because the crush cans are not backed by the vehicle frame that is disposed laterally inboard of the object.

There is a need to improve the crashworthiness of vehicles involved in a collision with a small offset object. This disclosure addresses the above problems and challenges relating to vehicle design. The extent of intrusion in the event of an offset impact is intended to be reduced by applying the disclosed concept as summarized below and with reference to the illustrated embodiments.

SUMMARY

According to one aspect of this disclosure, an apparatus is provided for managing energy of an offset impact by a vehicle having a frame and a front tire with an object laterally outboard of the frame. The apparatus may comprise a deflector attached to the frame that has an unexpanded condition and an expanded condition. The body of the vehicle surrounds the frame and defines a space in front of the front tire and adjacent to the deflector that is at least partially filled by the deflector in the expanded condition. The deflector is effective to rotate the vehicle to move a first side of the vehicle that impacts the object toward a longitudinal centerline of the vehicle during the impact.

According to another aspect of the disclosure, an intrusion avoidance apparatus is provided for a vehicle having a body, a frame, a bumper, and an impact absorbing member disposed between the frame and the bumper that defines a void within the body. The intrusion avoidance apparatus comprises an inflatable member, a sensor that provides a signal upon sensing that the void within the body of the vehicle is about to receive an object in the course of a collision with the object. A controller receives the signal and provides an actuation signal to a pyrotechnic inflator that is actuated by the actuation signal to inflate the inflatable member to fill the void.

According to a further aspect of the disclosure, an apparatus is provided for managing kinetic energy of a frontal impact with an object in a vehicle having a passenger compartment. The apparatus comprises a frame assembly, a bumper beam attached to the frame assembly and impact force absorbing elements attached between the frame assembly and the bumper beam. A pair of inflatable members may be disposed laterally outboard of the frame assembly and spaced rearward from the bumper beam. The inflatable members are attached to the frame assembly in a deflated condition. If the impact with the object occurs outboard from the frame assembly so that the frontal impact is not fully absorbed by the impact absorbing elements, the inflatable member is inflated to rotate the vehicle away from the object to reduce intrusion of the object into the vehicle toward the passenger compartment.

According to other optional aspects of the disclosure, the apparatus may further comprise a sensor disposed on the vehicle that senses the object impacted by the vehicle outboard of the frame and provides an offset impact signal to a controller. The controller receives the offset impact signal and provides an actuation signal to an inflator operatively connected to the deflector to inflate the deflector in response to the actuation signal. The sensor may sense the object before the object impacts the vehicle. The sensor may be selected from the group consisting essentially of a radar system or a machine vision system. Alternatively, the sensor may be an accelerometer or an electro-resistive sensor that senses the object when the object contacts the bumper of the vehicle.

The deflector may have a metal skin that is folded in the unexpanded condition and unfolded in the expanded condition. The deflector may be folded flat against the frame in the unexpanded condition.

The above aspects of the disclosure and other aspects will be apparent to one of ordinary skill in the art in view of the attached drawings and the following detailed description of the illustrated embodiments.

DETAILED DESCRIPTION

A detailed description of the illustrated embodiments of the disclosed concept is provided below. The disclosed embodiments are examples that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
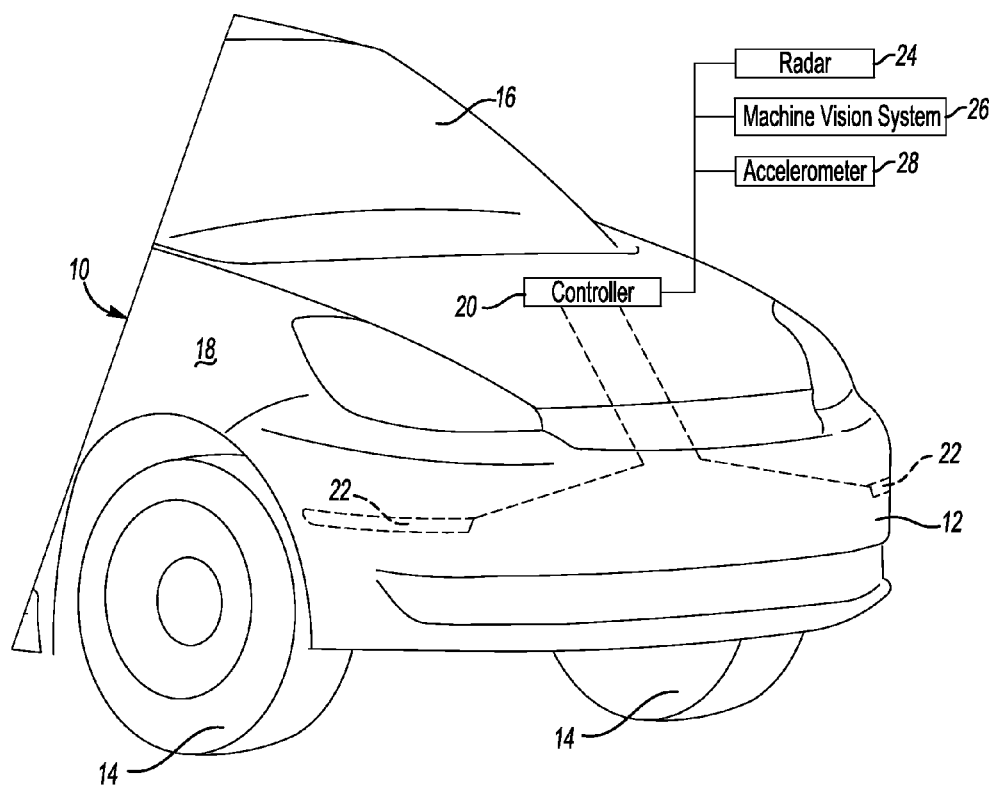
FIG. 1 is a fragmentary perspective view of the front of a vehicle with several different examples of sensors that are shown diagrammatically and may be used to sense an offset impact with an object.

Referring to FIG. 1, a front portion of a vehicle 10 is shown that includes the front bumper fascia 12 and a pair of front tires 14. The vehicle 10 includes a passenger compartment 16. A side 18 of the vehicle 10 is also partially illustrated. A controller 20 is diagrammatically represented that is adapted to receive a signal from a sensor 22, such as an electro-resistive sensor or a capacitive sensor. Alternatively, different types of sensors may be used, such as radar 24, a machine vision system 26, or one or more accelerometers 28. The sensors are used to sense or predictively sense an impact with the vehicle 10 and send an offset impact warning signal.

Figure 2:
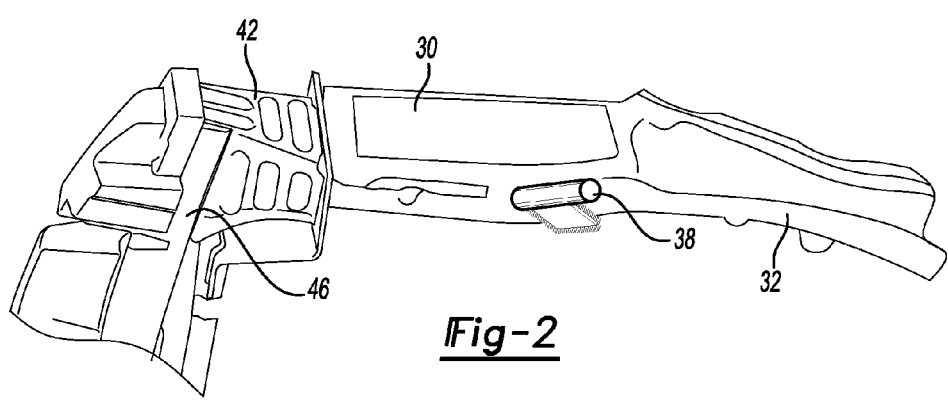
FIG. 2 is a fragmentary bottom plan view of a frame, bumper rail, impact absorbing member, and a deflated deflector.

Referring to FIG. 2, a deflector 30, or inflatable member, is shown attached to a frame rail 32. The frame rail 32 may be part of a vehicle frame or a frame assembly to which the inflatable member 30 is attached. An inflator 38 is also secured to the frame rail 32 and is operatively connected to the inflatable member 30 to inflate the inflatable member 30 in the event of a collision. An impact absorbing member 42 is shown disposed between a bumper beam 46 and the frame rail 32.

Figure 3:
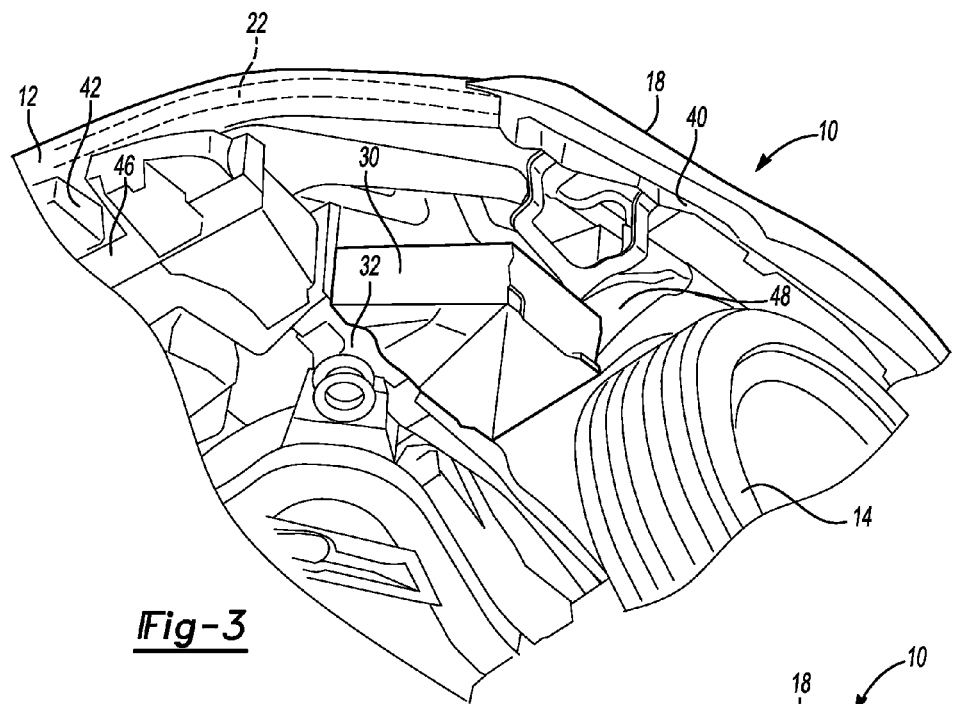
FIG. 3 is a fragmentary perspective view of a frame, bumper rail, impact absorbing member, and an inflated deflector.

Referring to FIG. 3, the deflector 30 is shown in its expanded or deployed position. The deflector 30 is attached to the frame rail 32 of the vehicle 10. The deflector fills a space 48, or void, located in the front quarter panel area of the vehicle 10. The space 48 is defined by the front tires 14, frame rail 32 and a body panel 40. The body panel 40 defines a portion of the side 18 of the vehicle 10. A sensor 22, such as an electro-resistive sensor, is shown disposed on the reverse side of the bumper fascia 12. Several impact absorbing members 42, such as crush cones, are shown between the bumper fascia 12 and the bumper beam 46. When the inflatable member 30, or deflector, is expanded it at least partially fills the space 48.

Figure 4:
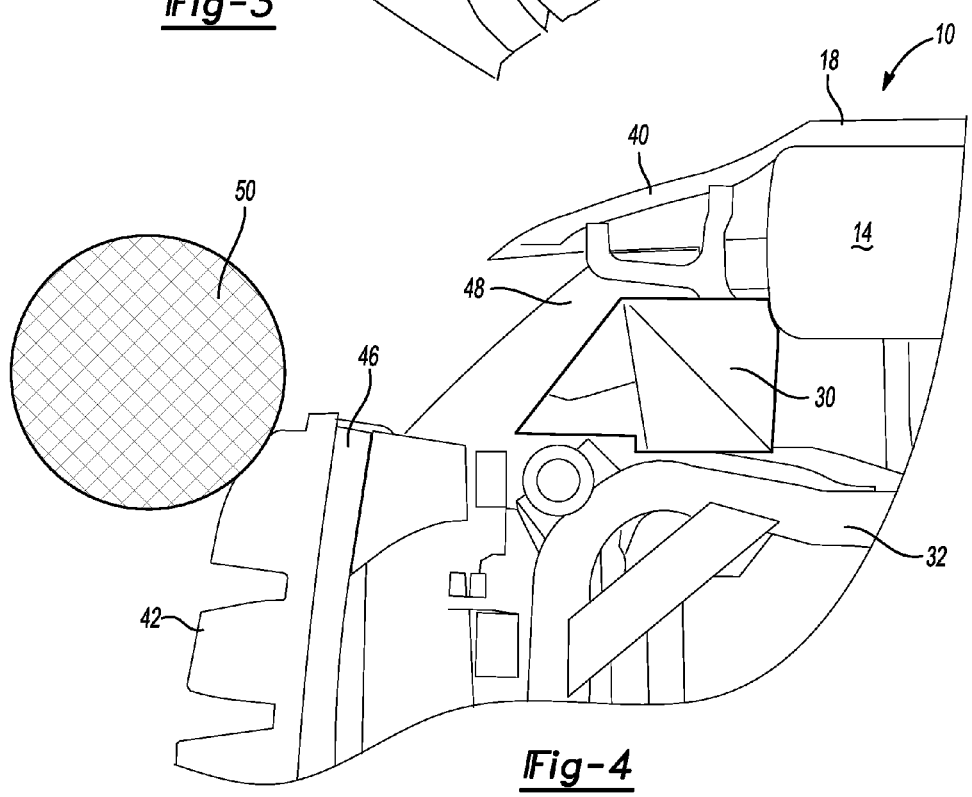
FIG. 4 is a fragmentary bottom plan view of a frame, bumper rail, impact absorbing member and an inflated deflector at the point of initial impact by the bumper with an object.

Referring to FIG. 4, the vehicle 10 is shown without bumper fascia just after contacting an object 50. At this point, the sensor 22, shown in FIGS. 1 and 3, will have been triggered. The deflector 30 is shown as it is inflated to at least partially fill the space 48, or void. The void 48 is formed by the frame rail 32, the front tire 14 and the body panel 40. The deflector 30 is located between the front tire 14 and the bumper beam 46. As shown in FIG. 4, the object 50 is shown in contact with the end impact member 42.

Figure 5:
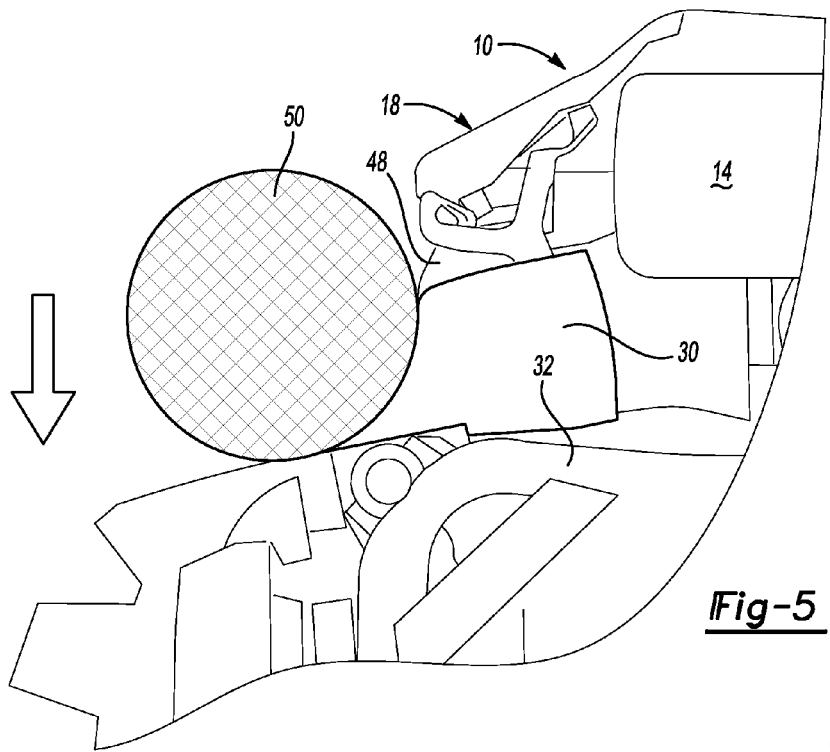
FIG. 5 is a fragmentary bottom plan view of a frame, bumper rail, impact absorbing member and an inflated deflector at the point of initial impact by the deflector with the object.

Referring to FIG. 5, the vehicle 10 is shown with the object 50 impacting the inflated deflector 30. The deflector 30 is shown deflecting the side 18 of the vehicle 10 toward the centerline of the vehicle as indicated by the arrow in FIG. 5. The deflector 30 is shown inflated and attached to the frame rail 32. The deflector 30, or inflatable member, is shown partially filling the space 48, or void, defined in the front quarter area of the vehicle 10.

Figure 6:
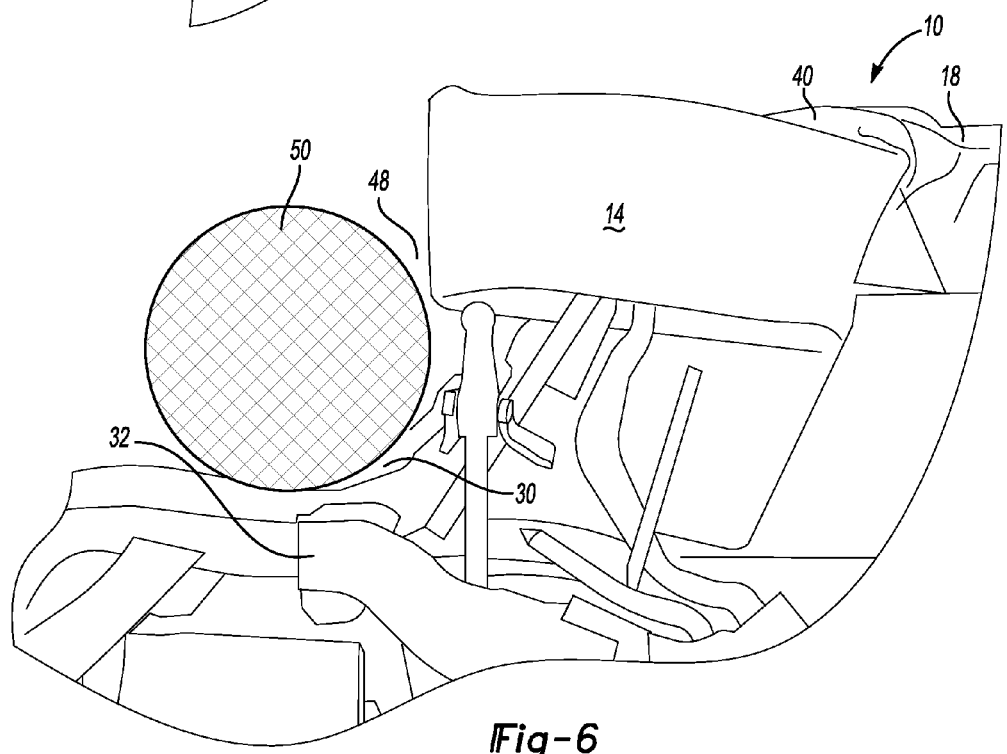
FIG. 6 is a fragmentary bottom plan view of a frame, bumper rail, impact absorbing member and an inflated deflector at the conclusion of the inflated deflector's impact with the object.

Referring to FIG. 6, the object 50 is shown with the vehicle 10 enveloping the object 50 within the space 48. The object 50 is shown just forward of the front tire 14 and the front tire 14 is shown displaced rearwardly. The side 18 of the vehicle 10 is shown with a deformed body panel 40 caused by displacement of the front tire 14. The object 50, shown in FIG. 6, may of course assume different positions in the vehicle or outboard of the side 18 of the vehicle depending upon the location and severity of a collision event.

In operation, this disclosure provides an apparatus for managing the energy of an offset impact by a vehicle 10 with an object 50 that is laterally outboard of the frame rail 32 of the vehicle 10. During a collision, a sensor 22 senses an impact with the object 50 or an impending impact may be sensed by a predictive sensor, such as a radar 24 or machine vision sensor 26. The sensor provides an offset impact signal to a controller 20 that receives the offset impact signal and provides an actuation signal. An inflator 38 is operatively connected to the inflatable member 30 to inflate the inflatable member 30 in response to the actuation signal received from the controller 20.

The inflatable member 30 may have a metal skin that is folded in its unexpanded condition and is unfolded in the expanded condition. The metal skin may be a foil-like skin that permits the inflatable member 30 to be folded flat against the frame rail 32 in the unexpanded condition. The metal skin of the inflatable member 30 is intended to increase its rigidity and durability. When the object 50 contacts the inflatable member 30, the side 18 of the vehicle 10 is moved toward the longitudinal centerline of the vehicle 10 during the impact. It should be understood that a pair of inflatable members 30 may be provided on opposite lateral outboard sides of the frame assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for managing energy of an object impacting a vehicle comprehensively laterally outboard of a front end longitudinal frame rail, comprising:
   a deflector attached to and folded against the frame rail rearward of a bumper beam and forward of a front tire in an unexpanded condition, the frame rail extending longitudinally proximate to and being inboard from the front tire, and the deflector being expandable to contact the impacting object.

2. The apparatus of claim 1 further comprising:
   a sensor disposed on the vehicle that senses the object outboard of the frame rail and provides an offset impact signal;
   a controller receives the offset impact signal and provides an actuation signal; and
   an inflator operatively connected to the deflector that inflates the deflector in response to the actuation signal.

3. The apparatus of claim 2 wherein the sensor senses the object before the object impacts the vehicle.

4. The apparatus of claim 2 wherein the sensor is selected from the group consisting essentially of a radar sensor and a machine vision sensor.

5. The apparatus of claim 2 wherein the sensor is an accelerometer.

6. The apparatus of claim 2 wherein the sensor is an electro-resistive sensor that senses the object when the object contacts a bumper of the vehicle.

7. The apparatus of claim 1 wherein the deflector has a metal skin that is folded in the unexpanded condition and unfolded in the expanded condition.

8. The apparatus of claim 1 wherein the deflector in the expanded condition impacts the object and influences a first side of the vehicle to move laterally toward a longitudinal centerline during the impact.

9. An intrusion avoidance apparatus for a vehicle having a body panel disposed on a side of a front portion of the vehicle and around a front tire, a frame rail disposed inboard from the body panel and front tire extending longitudinally forward from the front tire, and a transverse bumper connected to the frame rail forward of the front tire, the vehicle defining a void inboard from the body panel, outboard from the frame rail, forward of the front tire, and rearward of the bumper, the intrusion avoidance apparatus comprising:

an inflatable member secured to the frame rail, wherein the inflatable member has a metal skin for providing rigidity that is folded in the unexpanded condition and unfolded in the expanded condition;

a sensor that senses the void is about to receive an object in the course of a collision with the object, and provides an offset impact warning signal;

a controller receives the offset impact warning signal and provides an actuation signal; and a pyrotechnic inflator secured to the frame rail that is actuated by the actuation signal to inflate the inflatable member from the folded unexpanded condition into the unfolded expanded condition substantially filling the void providing a deflecting force against the object when the object enters the void.

10. An apparatus for managing energy of an object impacting a vehicle, comprising:

a deflector disposed on a frame rail of the vehicle that is folded in an non-inflated condition and unfolded in an inflated condition, wherein the vehicle defines a space forward of a front tire and outboard of the frame rail, and the deflector is inflatable to fill the space, impact the object, and deflect the vehicle and the object away from each other.

11. The apparatus of claim 9 wherein the sensor senses the object before the object impacts the vehicle.

12. The apparatus of claim 11 wherein the sensor is selected from the group consisting essentially of a radar sensor and a machine vision sensor.

13. The apparatus of claim 9 wherein the sensor is an accelerometer.

14. The apparatus of claim 9 wherein the sensor is an electro-resistive sensor that senses the object when the object contacts the bumper of the vehicle.

15. The apparatus of claim 9 wherein the inflatable member in the expanded condition impacts the object and influences a first side of the vehicle to move laterally toward a longitudinal centerline during the impact.

16. The apparatus of claim 10 further comprising:

a sensor disposed on the vehicle that senses the object impacted by the vehicle and provides an offset impact signal;

a controller receives the offset impact signal and provides an actuation signal; and an inflator operatively connected to and capable of inflating the deflector in response to the actuation signal.

17. The apparatus of claim 16 wherein the sensor is an electro-resistive sensor that senses the object when the object contacts a bumper of the vehicle.

18. The apparatus of claim 16, wherein the sensor is disposed on the vehicle to sense an object impact outboard of a frame assembly of the vehicle.

\* \* \* \* \*